R. E. HELLMUND.
REGENERATIVE CONTROL SYSTEM FOR ALTERNATING CURRENT MOTORS.
APPLICATION FILED APR. 29, 1915.

1,232,033.  Patented July 3, 1917.

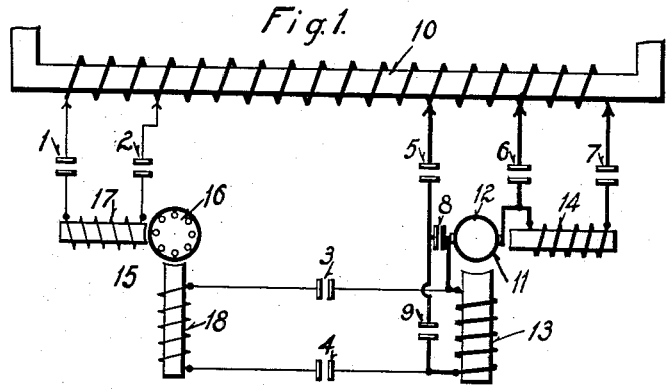

Fig. 1.

Fig. 2.
Sequence Chart.

| | 1 | 2 | 3 | 4 | 5 | 6 | 7 | 8 | 9 |
|---|---|---|---|---|---|---|---|---|---|
| Running | | | | | O | O | O | | O |
| Starting Phase Conv. | O | O | O | O | O | O | O | | O |
| Phase Conv. Running | O | O | | | O | O | O | | O |
| Regenerating | O | O | O | O | O | O | O | O | |

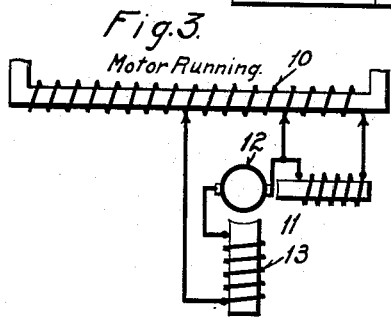

Fig. 3. Motor Running.

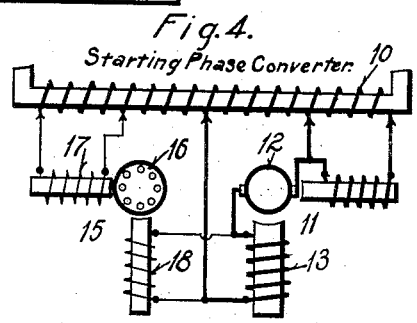

Fig. 4. Starting Phase Converter.

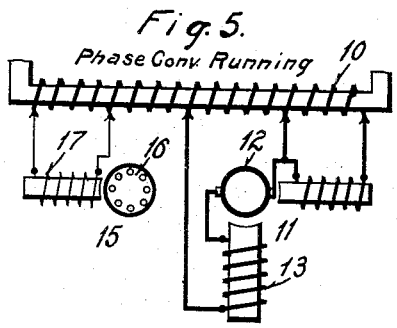

Fig. 5. Phase Conv. Running.

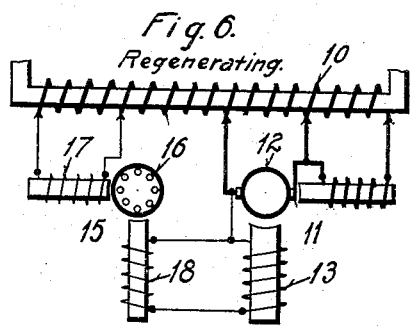

Fig. 6. Regenerating.

WITNESSES:
R. J. Fitzgerald
D. C. Davis

INVENTOR
Rudolf E. Hellmund.
BY
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

REGENERATIVE CONTROL SYSTEM FOR ALTERNATING-CURRENT MOTORS.

1,232,033. Specification of Letters Patent. Patented July 3, 1917.

Application filed April 29, 1915. Serial No. 24,732.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Regenerative Control Systems for Alternating - Current Motors, of which the following is a specification.

My invention relates to regenerating systems, such, for example, as are commonly employed on railway vehicles operating from a single-phase alternating current line, and it has for its object to provide means whereby the phase converter necessary for motor excitation during regeneration, if of the non-self-starting type, may be conveniently started.

In the accompanying drawing, Figure 1 is a diagrammatic view of the electrical equipment of a railway vehicle embodying my invention; Fig. 2 is a sequence chart showing the order of switch operation in the circuit of Fig. 1; and Figs. 3, 4, 5 and 6 are schematic views showing the different connections employed in the circuit of Fig. 1.

In the operation of single-phase alternating-current railway systems, it is frequently desirable to employ regeneration on down grades, and it is necessary that single-phase alternating current motors, when so employed, be excited by quadrature current, as disclosed in full in U. S. Patent No. 977,641, granted to the Westinghouse Electric & Manufacturing Company, Dec. 6, 1910 upon an application filed by Benjamin G. Lamme. In order to supply the proper quadrature exciting current, it is customary to employ a single-phase phase converter. Since a machine of this character, in common with single-phase alternating-current motors in general, is not self-starting, it is necessary to provide a rotating field by means of auxiliary circuits for the starting operation. By my invention, I derive quadrature current temporarily from one of the railway motors, when operating as a motor, and supply this quadrature current to the single-phase converter, together with current derived from the line, in order to establish a rotating field, so that, after the single-phase converter has been brought up to speed, it operates solely as a single-phase machine and may supply quadrature current to the motor for regenerative operation.

Referring to my invention as illustrated in Fig. 1, the transformer of a single-phase alternating-current railway vehicle is shown at 10. A railway motor 11 of the compensated, series, commutating type is provided with an armature 12, a main field winding 13 and a cross field winding 14. A phase converter of the single-phase type is shown at 15 and comprises a squirrel cage rotor 16, a main or exciting winding 17 and a generating or cross field winding 18 in quadrature relation thereto. During motor operation, the switches 5, 6, 7 and 9 are closed, connecting the machine 11 to the transformer 10 as a compensated, series, commutating motor of the doubly-fed type, as shown, for example, in Fig. 3. When it is desired to start the phase converter 15, the switches 1, 2, 3, 4, 5, 6, 7 and 9 are closed, and a circuit is completed, as shown in Fig. 4, whereby the machine 11 is connected to operate in the manner shown in Fig. 3; the winding 17 of the machine 16 is connected to the source, and the winding 18 of the machine 15 is connected in parallel with the main field winding 13 of the motor 12. With these connections, the winding 18 will be supplied with current in quadrature to the current flowing in the source 10 because of the high inductance of the winding 13, and the joint action of the windings 17 and 18 will be to establish a rotating field for starting the rotor 16. Having brought the phase converter up to speed, the vehicle may be run with the connection shown in Fig. 5, the converter 15 operating merely as a single-phase induction motor and the machine 11 operating as shown in Fig. 3. When it is desired to regenerate, the main field winding 13 of the machine 11 is disconnected from the source and connected to derive quadrature exciting current from the winding 18 of the machine 15, operating as a generating winding. The rotor 12 and the cross-field winding 14 of the machine 11 are connected to return energy to the source, in accordance with the principles set forth in the above-mentioned Patent No. 977,641.

While I have disclosed my invention in connection with a phase converter of the induction type, it is obvious to those skilled in the art that it is adapted to be applied to the starting of phase converting apparatus of the single-phase type of any character.

While I have described my invention in the preferred form thereof, it is susceptible of various minor changes and modifications without departing from the spirit thereof, and I desire, therefore, that only such limitations shall be placed thereupon as are imposed by the prior art or are specifically set forth in the appended claims.

I claim as my invention:

1. The combination with a source of single-phase alternating current, of a main dynamo-electric machine adapted for starting on single-phase alternating current energy, an auxiliary dynamo-electric machine incapable of starting solely on single-phase energy, connections from said machines to said source, means whereby an electromotive force, de-phased with respect to the electromotive force of said source, may be derived from said main machine for aiding in starting said auxiliary machine, and means whereby said auxiliary machine may be subsequently employed for supplying a de-phased electromotive force for aiding in the field excitation of said main machine.

2. The combination with a source of single-phase alternating current of a main dynamo-electric machine of the commutator type, an auxiliary dynamo-electric machine of the polyphase induction motor type, connections from one phase of said auxiliary machine to said source, means for connecting said main machine to said source for the starting thereof, means for deriving a de-phased electromotive force from said main machine when running and for supplying said de-phased electromotive force to another phase of said auxiliary machine for the starting thereof, and means for thereafter deriving an electromotive force from a phase of said auxiliary machine which is displaced with respect to the phase which is connected to said source and for supplying said electromotive force to aid in the field excitation of said main machine.

3. In a single-phase alternating-current regenerating system, the combination with a current source, of a main dynamo-electric machine of the series, commutating type, a phase converter of the non-self-starting but self-propelling type for deriving current from said source suitable for the excitation of said machine during regeneration, and means for deriving current from said dynamo-electric machine, when operating as a motor and for combining said current with current derived from said source to produce a rotating magnetic field suitable for starting said phase converter, and means for subsequently employing a de-phased electromotive force, supplied by said converter, in the excitation of said main dynamo-electric machine.

4. The combination with a single-phase alternating-current source, of a dynamo-electric machine connected thereto and adapted to operate either as a motor or as a generator, a self-propelling, phase converter for deriving current from said source suitable for the excitation of said machine, said phase-converter being provided with two field windings in quadrature to each other, and means whereby said phase converter may be started, said means comprising connections from one of said windings to points of different potential in the main field winding of said dynamo-electric machine and from the other of said converter windings to said source, whereby a rotating magnetic field is established in said phase converter.

5. The combination with a source of single-phase alternating current, of a reversible self-starting dynamo-electric machine, a non-self-starting phase converter, connections for deriving quadrature current from said machine, when operating as a motor, for assisting in providing a rotating magnetic field for the starting of said phase converter, and connections whereby said phase-converter may subsequently supply quadrature exciting current to said machine for generator action therein suitable for energy supply to said source.

6. The method of operation of a system embodying a source of single-phase, alternating current, a self-starting dynamo-electric machine and a non-self-starting phase-converter, together with suitable connections therebetween, which comprises initially operating said dynamo-electric machine as a motor, deriving a de-phased electromotive force therefrom, combining said de-phased electromotive force with an electromotive force derived directly from said source for starting said phase-converter, and finally employing said phase-converter to produce a de-phased electromotive force to be applied to a field winding of said dynamo-electric machine.

7. The method of operating an alternating current system embodying a source of single-phase alternating current, a commutator type motor, means for either imposing a load on said motor or for supplying driving torque thereto, an auxiliary phase-converter of the polyphase induction motor type, and suitable connections, which comprises starting said motor, deriving a de-phased electromotive force from the exciting winding thereof and applying said electromotive force to one phase of said converter while applying to another phase of said converter an electromotive force derived directly from said source, thus starting said phase-converter, and finally connecting said motor for recuperative operation, applying to the exciting field winding thereof a de-phased electromotive force produced by said phase-converter.

In testimony whereof, I have hereunto subscribed my name this 23rd day of April, 1915.

RUDOLF E. HELLMUND.